L. W. BEAL.
Wheel Plow.
No. 78,856.
Patented June 16, 1868.
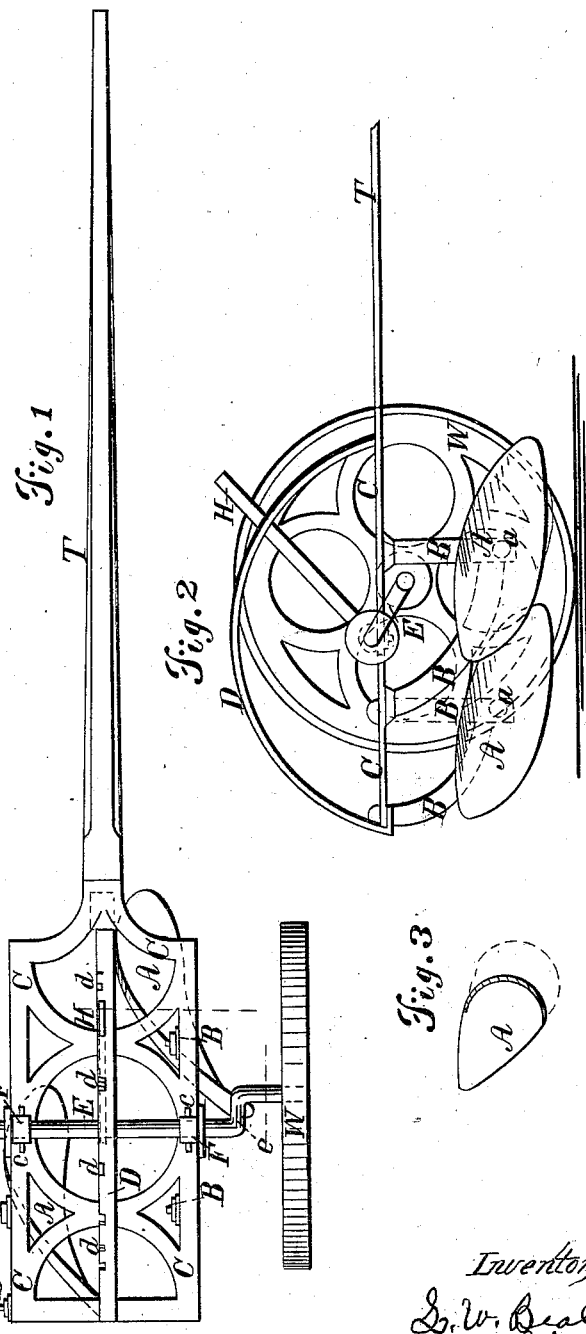

United States Patent Office.

LEONARD W. BEAL, OF DIXON, ILLINOIS, ASSIGNOR TO HIMSELF AND A. D. DREW, OF SAME PLACE.

*Letters Patent No. 78,856, dated June 16, 1868.*

IMPROVEMENT IN PLOWS.

*The Schedule referred to in these Letters Patent and making part of the same.*

TO ALL WHOM IT MAY CONCERN:

Be it known that I, LEONARD W. BEAL, of Dixon, in the county of Lee, and State of Illinois, have invented a new and useful Improvement in Plows; and I do hereby declare and make known that the following is a full, clear, and exact description of the same, reference being had to the accompanying drawings, and the letters and figures marked thereon, which form part of this specification.

My said invention consists in a mould-board of a novel form and construction, by the use of which plows may be made without land-sides or points separate from the mould-board; and it further consists in a novel mode of attaching said plow, or one or more of said plows, to a sulky-frame and wheels; and it further consists in a novel mode of attaching the axle to the frame of the plough, so that the direction of the axle across the frame may be varied, to cause the plows to run more or less to land, as may be desired; and it also consists in constructing the mould-board in such a form that, when the front end becomes worn, the mould-board can be reversed, its rear end being placed forward, and its upper edge downward, substantially as hereinafter described.

To enable those skilled in the art to understand how to construct and use my invention, I will proceed to describe the same with particularity, making reference, in so doing, to the aforesaid drawings, in which—

Figure 1 represents a plan view of my invention.

Figure 2 is a side elevation of the same; and

Figure 3 is a section through one of the plows, A, taken at the line $x$ in fig. 1.

Similar letters of reference, in the several figures, denote the same parts of my said invention.

A represents the plow, which is formed of a single plate of metal, formed up into the desired concave shape, the said plate being defined by curved lines.

The front and rear ends are made of the same configuration, with rounded points, so as to be reversible, whereby the plow can be changed, so as to present the rear end for the cutter, by turning the plate upside down, when the upper rear corner or rounded point becomes the lower front point, which parts exactly correspond in the configuration of the plate.

The plow above described does not cut the furrow in a vertical line from the land, and does not cut a flat furrow upon the bottom, the configuration of the plow being such that a furrow is cut with a curved face and bottom, the curve of the face extending beneath, so as to form a circular or curved furrow in the ground.

The point where the cutting-part of the plow is, or that part of the plow which extends farthest forward, instead of being next the land-side, as is the case of ordinary plows, is on the outer side of the furrow, farthest from the land-side, as shown.

The said plows, one or more, are secured to a standard, B, by means of a bolt and nut, shown at $a$, said standard being braced, as shown, and secured, by bolts and nuts, or otherwise, to the frame C in such a manner as to be reset at different heights, as may be desired.

It will be observed that the axle E is secured to the frame C by means of boxes F, which are provided with arms, projecting down through the longitudinal slots $c$ $c$ in the sides of the frame, said arms being provided with screw-nuts under the frame, whereby said boxes F are firmly secured to the frame, while, by loosening said nuts, the boxes F, which carry the axle, may be adjusted, upon either side, forward or backward, so as to cause the axle to lie directly across the frame, or to lie diagonally across the same, to make the plows run to or from the land, as may be desired. It will also be observed that the axle E is formed with elbows or crank-bends at $e$ $e$.

The frame C is provided with a semicircular strip of iron or other metal, D, extending from the front to the rear of the frame C, which is provided with notches $d$ upon one side.

To the axle E is rigidly attached a lever, H, so that, by throwing said lever forward or back, and pressing it into one of the notches $d$ upon the bar D, the bends in the axle $e$ may be turned down, so as to raise the plows clear of the ground, to move the implement from place to place; or the bend in the axle may be turned up, so as to let the plows below the bottom of the wheels, either to the full extent, or to any desired depth, thus gauging the depth of the furrow, as may be desired.

It may be observed that the adjustability of the axle across the frame may be effected by securing the boxes thereof to the frame in any other suitable manner, provided they have a longitudinal adjustment upon the frame, and also that other means than the lever H and curved bar D may be employed for raising, lowering, and regulating the depth of the plows.

The plows A, from their configuration and shape, render a separate point and a land-side entirely unnecessary, and enables the entire plow to be formed of a single plate, while its form and mode of attachment at its centre, and its symmetrical proportions before and behind, and above and below its point of attachment to the standard, at a, render it reversible, as aforesaid.

This plow, one or more, may be attached to an ordinary plow-beam, or any other suitable device; or one or more of them may be attached to a sulky or wheeled frame, to operate as a gang.

Having described the construction and operation of my improvement, I will proceed to specify what I claim, and desire to secure by Letters Patent.

1. I claim a plow-plate A, constructed substantially as described, so as to dispense with a land-side and separate point, and operating as specified and described.

2. I claim the plow-plate A, when constructed in the curved form, symmetrically before and behind its point of attachment to its standard, so as to operate and be reversible, substantially as described and shown.

3. I claim the combination of one or more plows, A, constructed substantially as described, with a frame, C, and wheels W, substantially as set forth.

4. I claim securing the axle E to the frame C in such a manner as to be adjusted, at pleasure, to vary its direction across the frame, substantially as herein set forth and described.

L. W. BEAL.

Witnesses:
    CYRUS A. DAVIS;
    S. H. WHITMORE.